US012253642B2

(12) United States Patent
Manikani et al.

(10) Patent No.: US 12,253,642 B2
(45) Date of Patent: Mar. 18, 2025

(54) QUANTIFYING DIVERSITY IN SEISMIC DATASETS

(71) Applicant: Schlumberger Technology Corporation, Sugar Land, TX (US)

(72) Inventors: Sunil Manikani, Pune (IN); Haibin Di, Houston, TX (US); Leigh Truelove, Crawley (GB); Cen Li, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/715,059

(22) PCT Filed: Apr. 10, 2023

(86) PCT No.: PCT/US2023/018003
§ 371 (c)(1),
(2) Date: May 30, 2024

(87) PCT Pub. No.: WO2023/200696
PCT Pub. Date: Oct. 19, 2023

(65) Prior Publication Data
US 2024/0427042 A1    Dec. 26, 2024

Related U.S. Application Data

(60) Provisional application No. 63/362,777, filed on Apr. 11, 2022.

(51) Int. Cl.
*G01V 1/30* (2006.01)

(52) U.S. Cl.
CPC .............. *G01V 1/302* (2013.01); *G01V 1/307* (2013.01)

(58) Field of Classification Search
CPC .............................. G01V 1/302; G01V 1/307
See application file for complete search history.

(56) References Cited

U.S. PATENT DOCUMENTS

| | | |
|---|---|---|
| 2013/0235696 A1 | 9/2013 | Larsen |
| 2015/0094958 A1* | 4/2015 | Al-Dossary .............. G01V 1/34 |
| | | 702/6 |
| 2017/0227664 A1 | 8/2017 | Dossary |
| 2018/0259664 A1 | 9/2018 | Li |
| 2019/0011582 A1 | 1/2019 | Aarre |
| 2020/0284936 A1* | 9/2020 | da Silva Ferreira ... G01V 1/302 |
| 2021/0003726 A1 | 1/2021 | Wang |
| 2022/0099852 A1* | 3/2022 | Roy ....................... G06F 18/211 |
| 2023/0161061 A1* | 5/2023 | Denli ....................... G01V 1/30 |
| | | 702/14 |

OTHER PUBLICATIONS

Search Report and Written Opinion of International Patent Application No. PCT/US2023/018003 dated Jul. 18, 2023, 8 pages.
(Continued)

*Primary Examiner* — Ricky Go
(74) *Attorney, Agent, or Firm* — Jeffrey D. Frantz

(57) ABSTRACT

A method includes receiving a seismic survey that includes a plurality of seismic slices. The method also includes converting the seismic slices into an embedding. The embedding includes one or more vectors. Each of the vectors includes more than 3 dimensions. The method also includes generating a plot based at least partially upon the embedding.

14 Claims, 12 Drawing Sheets

(56) References Cited

OTHER PUBLICATIONS

Jones, J. P. et al., "Quantifying the similarity of seismic polarizations", Geophysical Journal International, 2016, 204 (2). pp. 968-984.

Lewandowski, M. et al., "Seismic Attributes Similarity in Facies Classification", in Intelligent Methods and Big Data in Industrial Applications, Springer, 2019, pp. 171-181.

Appalaraju, S. et al., "Image similarity using Deep CNN and Curriculum Learning", downloaded from the internet on May 23, 2024 at [https://arxiv.org/ftp/arxiv/papers/1709/1709.08761.pdf], arXiv:1709.08761, 2017, 9 pages.

* cited by examiner

| Facies Index | Clustering based recommendation | | | Systematic random sampling | | |
|---|---|---|---|---|---|---|
| | Precision | Recall | F1 | Precision | Recall | F1 |
| 1 | 0.9475 | 0.9834 | 0.9651 | 0.9174 | 0.9526 | 0.9347 |
| 2 | 0.9173 | 0.8512 | 0.8830 | 0.8670 | 0.7603 | 0.8102 |
| 3 | 0.6552 | 0.9312 | 0.7692 | 0.5146 | 0.7610 | 0.6140 |
| 4 | 0.9288 | 0.9253 | 0.9271 | 0.7964 | 0.9000 | 0.8451 |
| 5 | 0.4874 | 0.8275 | 0.6135 | 0.2859 | 0.8665 | 0.4299 |
| 6 | 0.7116 | 0.8233 | 0.7634 | 0.6801 | 0.6847 | 0.6824 |
| | Average F1: 0.8202<br>Accuracy: 0.8918<br>Average F1 (weighted\*): 0.7253<br>Accuracy (weighted\*): 0.7371 | | | Average F1: 0.7194<br>Accuracy: 0.8174<br>Average F1 (weighted\*): 0.5892<br>Accuracy (weighted\*): 0.6618 | | |

\* 20x more weights on facies No. 3, 5 & 6 than facies No. 1, 2 & 4

FIG. 10

QUANTIFYING DIVERSITY IN SEISMIC DATASETS

CROSS-REFERENCE TO RELATED APPLICATIONS

This patent application is the National Stage Entry of International Application No. PCT/US2023/018003, filed Apr. 10, 2023, which claims priority to provisional patent application No. 63/362,777, filed on Apr. 11, 2022, the entirety of which is incorporated by reference.

BACKGROUND

Supervised and semi-supervised machine learning (ML) algorithms may be used in the seismic domain to identify geobodies in a subterranean domain such as salt domes, faults, and stratigraphy layers. These algorithms may have a dependency on domain experts (e.g., geo-scientists and geo-modelers) to identify the sections to be used as training samples. A commonly used strategy to identify training samples is 'systematic random sampling,' where a seismic slice is randomly selected, and the interval is incremented by a fixed number. This strategy does not account for underlying diversity within the seismic survey. For example, some areas may have dramatic changes in geology.

As a result, some projects may use a domain expert to assist the algorithm. However, the addition of the domain expert can make this a laborious, iterative, and/or cost-intensive process. For example, the domain expert may spend excessive time analyzing a 3D seismic volume. In another example, the domain expert may treat a single 3D volume and a plurality of 2D seismic line datasets as the same. In addition, there is currently no way to quantify and visualize diversity in the seismic volume. There is also no current tool that recommends which particular seismic label to select for training ML algorithms.

SUMMARY

A method for quantifying diversity in a seismic dataset is disclosed. The method includes receiving a seismic survey that includes a plurality of seismic slices. The method also includes converting the seismic slices into an embedding. The embedding includes one or more vectors. Each of the vectors includes more than 3 dimensions. The method also includes generating a plot based at least partially upon the embedding.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving one or more first seismic surveys. Each of the one or more first seismic surveys includes a plurality of first seismic slices. Each of the first seismic slices includes a plurality of tiles. The operations also include reconstructing seismic amplitudes of the tiles using an auto-encoder. The operations also include training the auto-encoder based at least partially upon the reconstructed seismic amplitudes to produce a trained auto-encoder. The operations also include receiving a second seismic survey. The second seismic survey includes a plurality of second seismic slices. The operations also include converting the second seismic slices into an embedding using the trained auto-encoder. The embedding includes one or more vectors. Each of the one or more vectors includes more than 3 dimensions. The operations also include applying a clustering algorithm to the embedding to provide a clustered embedding. The operations also include reducing a number of dimensions of the clustered embedding to 2D or 3D to produce a 2D or 3D clustered embedding. The operations also include generating a plot of the 2D or 3D clustered embedding.

A non-transitory computer-readable medium is also disclosed. The medium stores instructions that, when executed by at least one processor of a computing system, cause the computing system to perform operations. The operations include receiving one or more first seismic surveys. Each of the one or more first seismic surveys includes a set of two-dimensional (2D) lines or a three-dimensional (3D) volume. Each of the one or more first seismic surveys includes a plurality of first seismic slices of the same dimension or different dimensions. Each of the first seismic slices includes a plurality of tiles. The operations also include normalizing seismic amplitudes of the tiles to be within a range from −1 to 1. The operations also include randomly shuffling the tiles, after normalizing the seismic amplitudes, to produce shuffled tiles. The operations also include reconstructing seismic amplitudes of the shuffled tiles using an auto-encoder. The operations also include calculating a loss between the seismic amplitudes and the reconstructed seismic amplitudes using the auto-encoder. The loss is calculated as a mean square error (MSE) value. The operations also include training the auto-encoder to reduce the MSE value to produce a trained auto-encoder. The operations also include receiving a second seismic survey. The second seismic survey includes a set of 2D lines or a 3D volume. The second seismic survey includes a plurality of second seismic slices of the same dimension or different dimensions. The operations also include normalizing seismic amplitudes of the second seismic slices to be within the range from −1 to 1. The operations also include converting the second seismic slices, after normalizing the seismic amplitudes of the second seismic slices, into an embedding using the trained auto-encoder or a pre-trained segmentation task-specific model. The second seismic slices are converted using an encoder of the trained auto-encoder or the pre-trained segmentation task-specific model. The embedding includes one or more vectors. Each of the one or more vectors includes more than 3 dimensions. The operations also include applying a clustering algorithm to the embedding to provide a clustered embedding. The operations also include reducing a number of dimensions of the clustered embedding to 2D or 3D to produce a 2D or 3D clustered embedding. The operations also include generating a plot of the 2D or 3D clustered embedding. The operations also include identifying one or more of the second seismic slices in the clustered embedding in the plot to produce one or more identified slices. The operations also include labeling the one or more identified slices to produce one or more labeled slices. The operations also include training a model to perform a downstream task based at least partially upon the one or more labeled slices.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 10 illustrates a table showing results for FIGS. 9A and 9B, according to an embodiment.

DETAILED DESCRIPTION

Figure 1A:
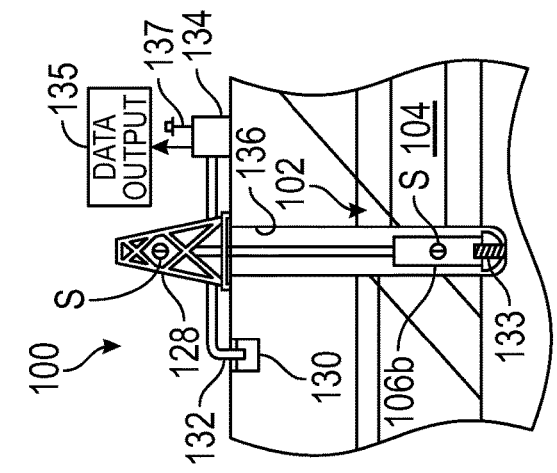
FIGS. 1A, 1B, 1C, 1D, 2, 3A, and 3B illustrate simplified, schematic views of an oilfield and its operation, according to an embodiment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. Although embodiments of the present method are at least partially described herein with reference to an oilfield, it will be appreciated that this is merely an illustrative example. Embodiments of the present method may be employed in any application in which visualizing, modeling, or otherwise identifying subsurface features (e.g., geological features) may be useful. Examples outside of the oilfield context include subsurface mapping for wind arrays and/or solar arrays, geothermal energy production, mining operations, offshore/deep ocean applications, etc.

FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

Figure 1B:
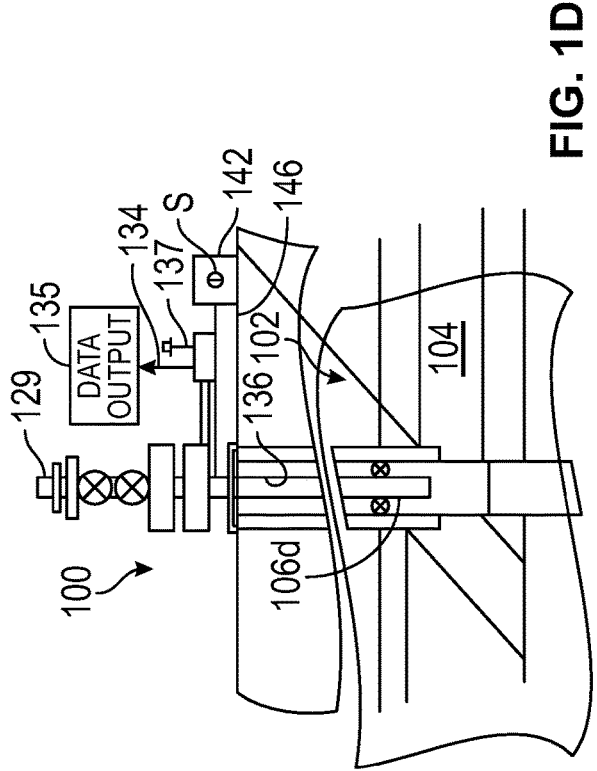

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
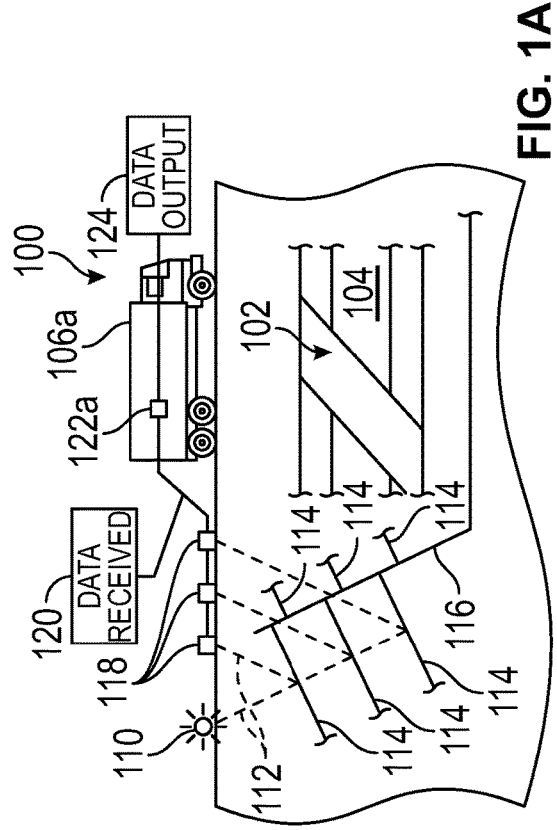

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106.1 of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

Figure 1D:
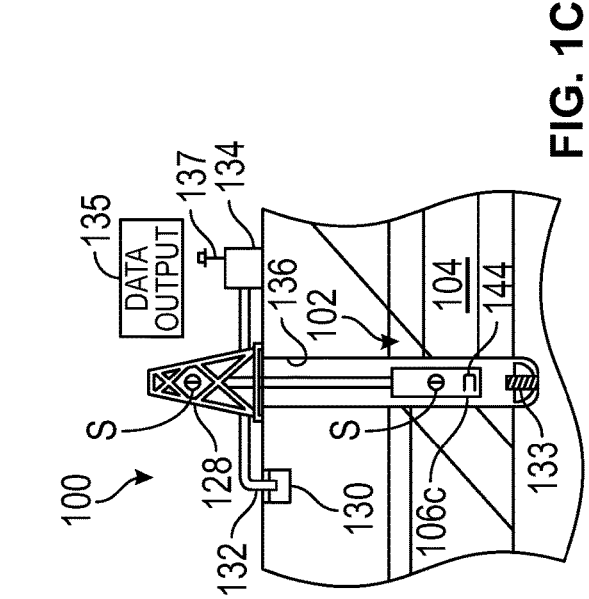

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
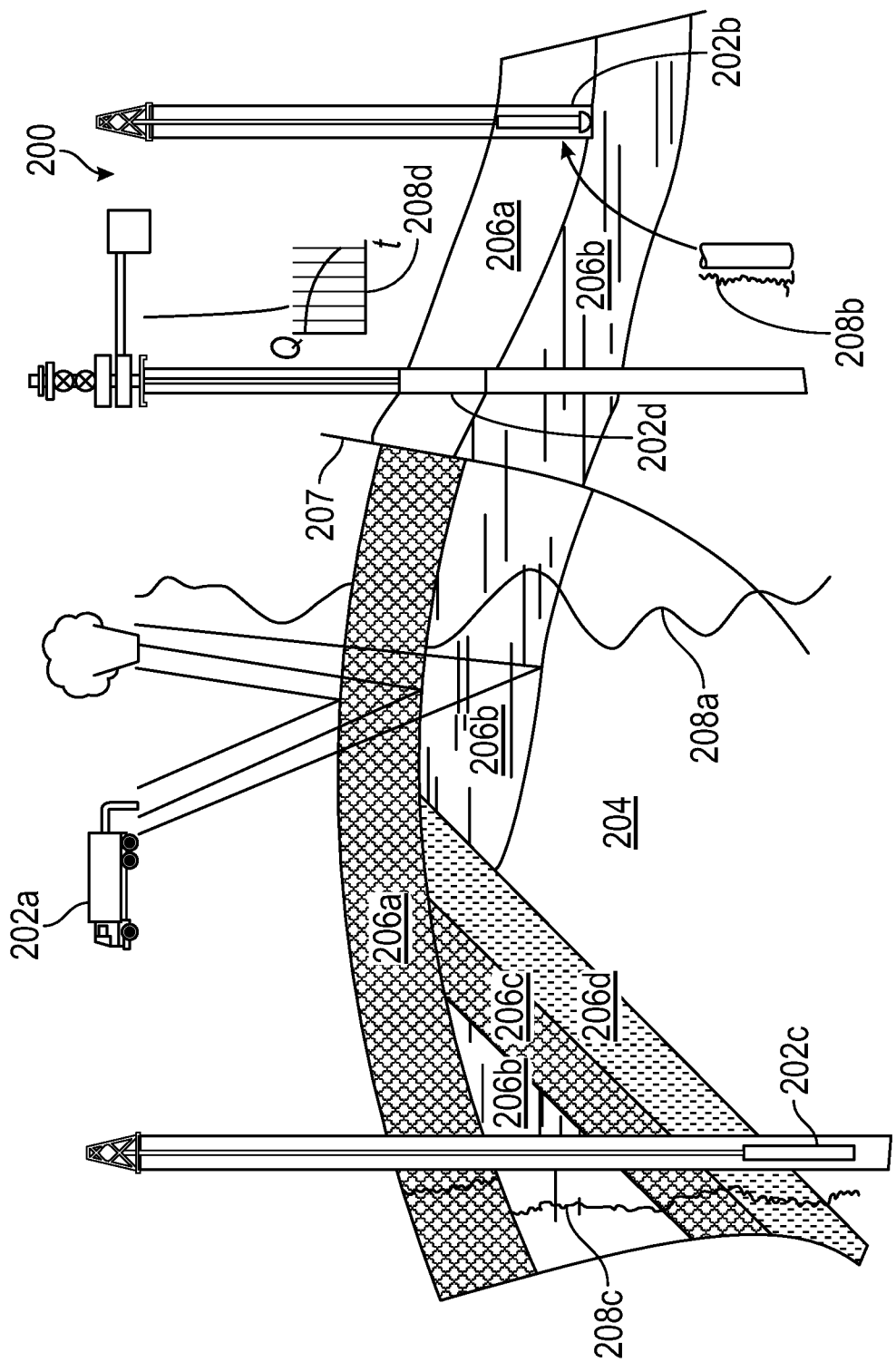

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202b generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208cmay also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
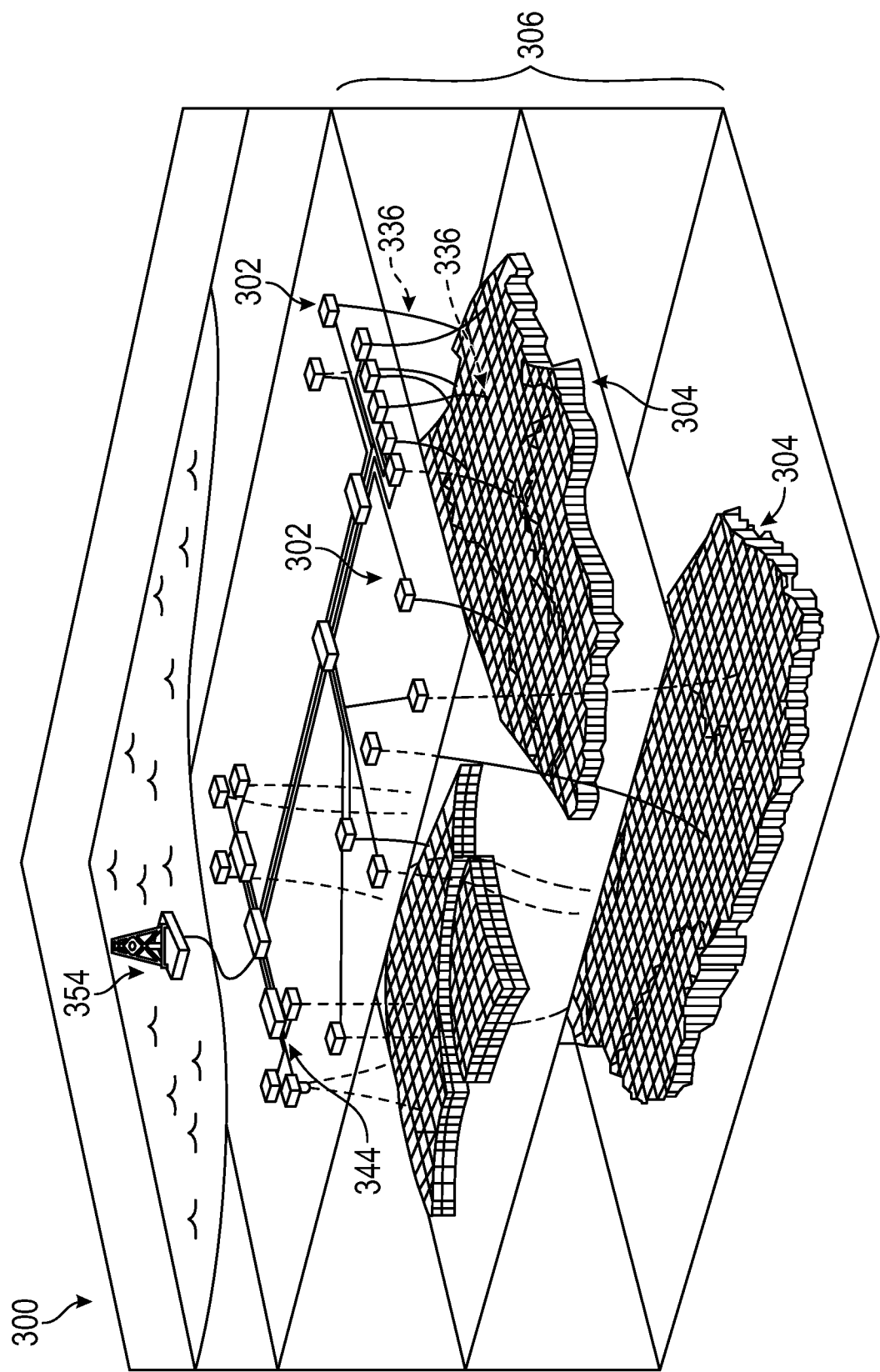

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
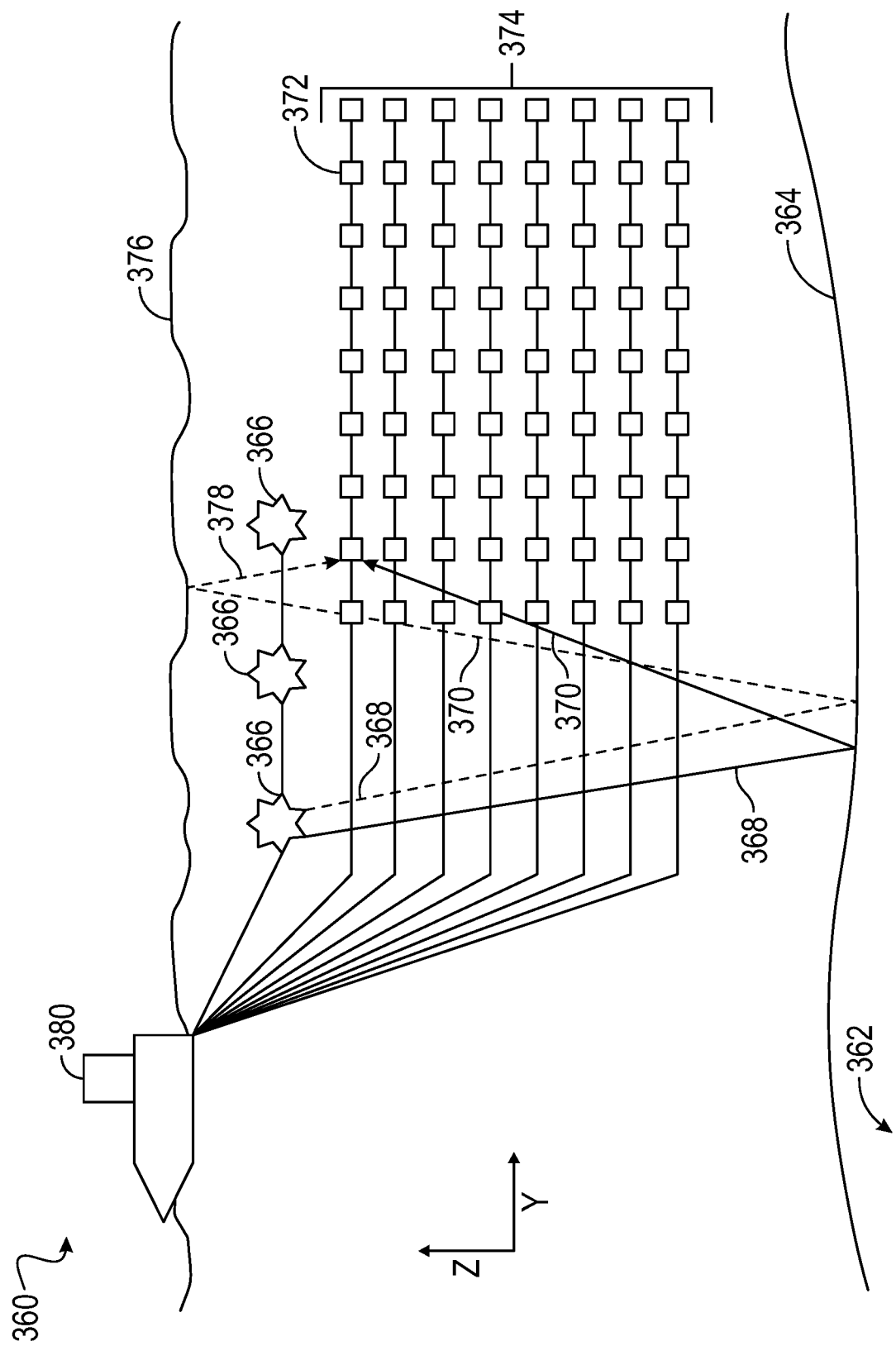

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Exploring and Quantifying Diversity in 2D and 3D Seismic Datasets

The system and method described herein may reduce turnaround time and provide quantitative analysis of diversity in 3D seismic datasets using a multi-stage machine learning (ML) algorithm. As used herein, "diversity" refers to how similar or dissimilar one seismic portion (e.g., volume, slice, section) is from another seismic portion. On visual inspection and/or by recording metrics on test data, it may be seen that the system and method achieve an uplift in geobody segmentation tasks on multiple seismic datasets. As a result, the system and methods may be used by domain experts when performing exploration geophysics and reservoir characterization.

Figure 4:
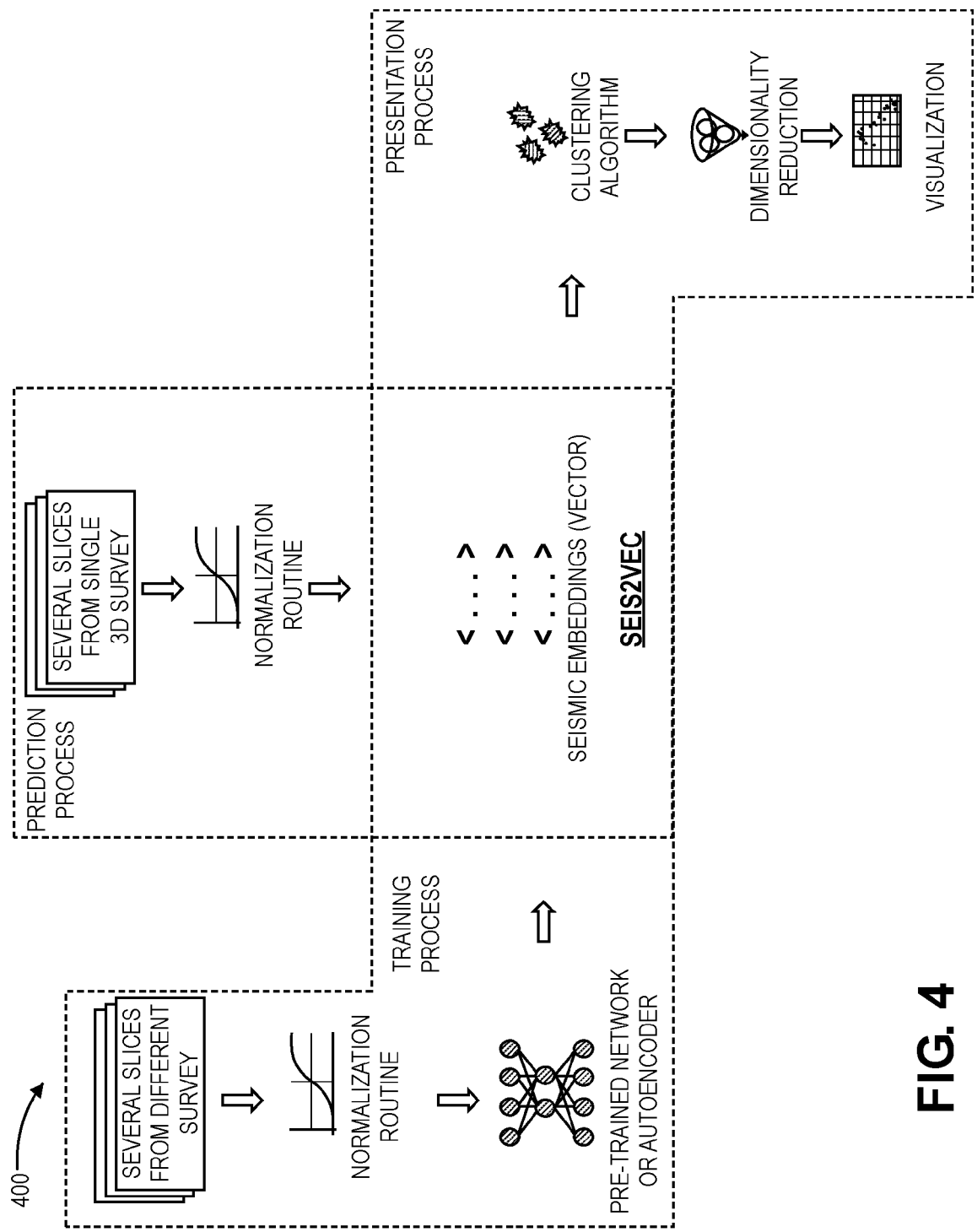
FIG. 4 illustrates a flow diagram for generating seismic embeddings, according to an embodiment.

FIG. 4 illustrates a flow diagram 400 for generating seismic embeddings, according to an embodiment. The diagram also shows how the embeddings, when applied to a new seismic survey (e.g., a seismic dataset), may be presented to a user to show underlying diversity. First, a ML model may be trained (e.g., unsupervised training) using one or more seismic datasets. For example, this may include training an auto-encoder. In another embodiment, the training may be omitted, and a task-specific pre-trained model may instead be used.

One or more 3D seismic volume slices may then be received, and a prediction may be made to obtain seismic embeddings using the model based at least partially upon the 3D seismic volume slice(s). A clustering algorithm may be applied to the results from the prediction, and the clustered results may then be visualized in reduced dimensions. The visualization may be used for downstream tasks such as geobody segmentation. The flow diagram in FIG. 4 is described in greater detail with respect to FIG. 5.

Figure 5:
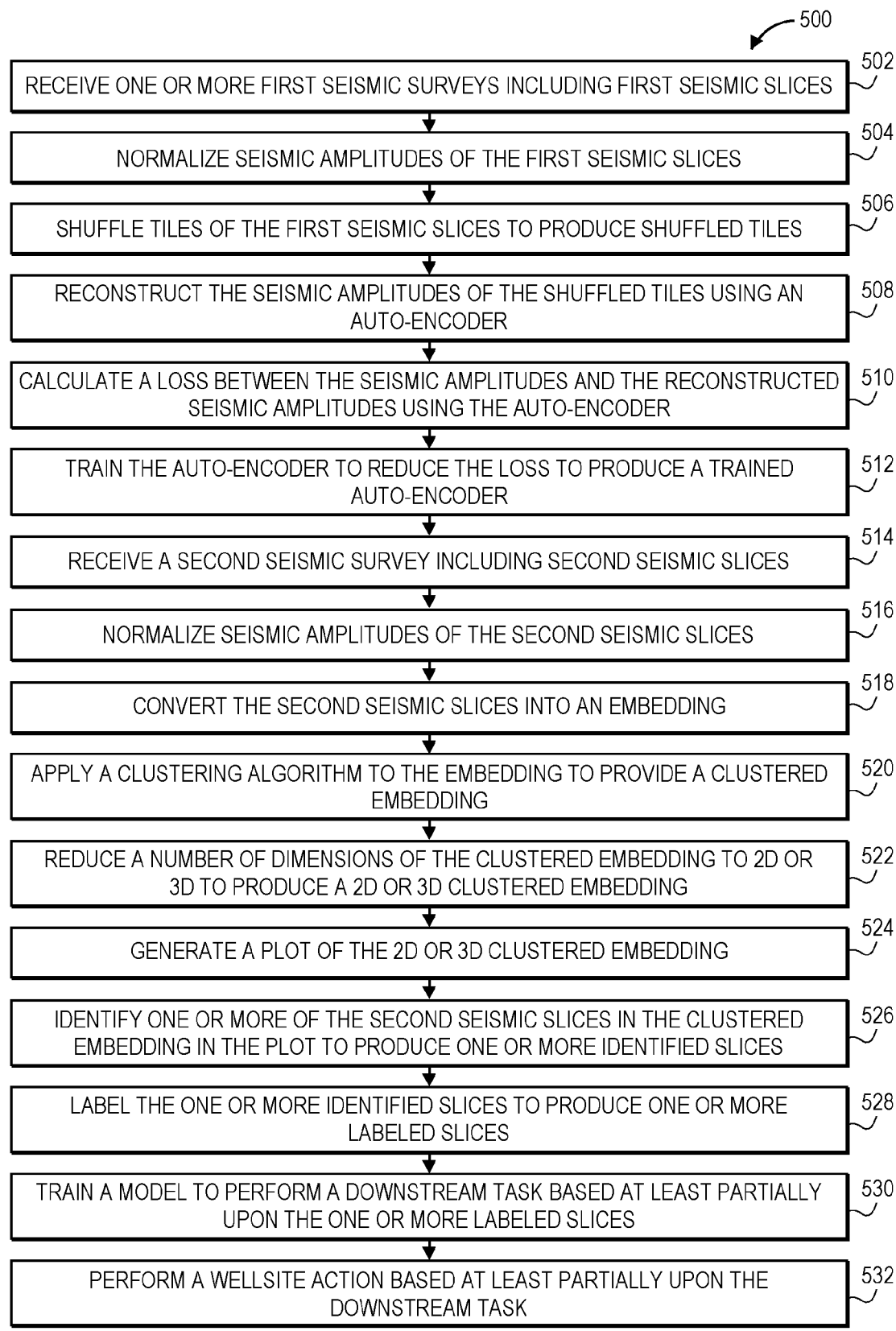
FIG. 5 illustrates a flowchart of a method for quantifying diversity in a seismic survey, according to an embodiment.

FIG. 5 illustrates a flowchart of a method 500 for quantifying diversity in a seismic survey, according to an embodiment. An illustrative order of the method 500 is provided below; however, one or more stages of the method 500 may be performed in a different order, combined, split, repeated, or omitted. One or more portions of the method 500 may be performed by a computing system 1100 (described below).

The method 500 may include receiving one or more first seismic surveys, as at 502. As described below, the first seismic surveys may be used to train an auto-encoder. Thus, the first seismic surveys may also be referred to as training seismic surveys. Each of the one or more first seismic surveys may include a set of two-dimensional (2D) lines or a three-dimensional (3D) volume. Each of the one or more first seismic surveys may include a plurality of first seismic slices of the same dimension or different dimensions. Each of the first seismic slices may include a plurality of tiles.

The method 500 may also include normalizing seismic amplitudes of the first seismic slices, as at 504. The seismic amplitudes may be normalized to be within a range from −1 to 1.

The method 500 may also include shuffling the tiles of the first seismic slices to produce shuffled tiles, as at 506. The tiles may be randomly shuffled after normalizing the seismic amplitudes.

The method 500 may also include reconstructing the seismic amplitudes of the shuffled tiles using an auto-encoder, as at 508. Reconstructing the seismic amplitudes may include synthetically introducing gaps into the shuffled tiles. This may be referred to as in-painting.

The method 500 may also include calculating a loss between the seismic amplitudes (before or after normalizing) and the reconstructed seismic amplitudes using the auto-encoder, as at 510. The loss may be calculated as a mean square error (MSE) value.

The method 500 may also include training the auto-encoder to produce a trained auto-encoder, as at 512. The auto-encoder may be trained to reduce the MSE value. The training may be augmented using techniques such as flipping and/or rotation, and regularization may be introduced using techniques such as dropout.

The method 500 may also include receiving a second seismic survey, as at 514. The second seismic survey may include a set of 2D lines or a 3D volume. The second seismic survey may include a plurality of second seismic slices of the same dimension or different dimensions.

The method 500 may also include normalizing seismic amplitudes of the second seismic slices, as at 516. For example, the seismic amplitudes may be normalized to be within the range from −1 to 1.

The method 500 may also include converting the second seismic slices into one or more embeddings, as at 518. The second seismic slices may be converted after normalizing the second seismic slices. In one embodiment, the second seismic slices may be converted using the trained auto-encoder (e.g., from 512 above). In another embodiment, one or more of the previous stages of the method 500 may be omitted, and the second seismic slices may be converted using a pre-trained segmentation task-specific model. The second seismic slices may be converted using an encoder of the trained auto-encoder or an encoder of pre-trained segmentation task-specific model. The embedding(s) may be generated from a bottleneck layer of the trained auto-encoder or the pre-trained segmentation task-specific model.

The embedding(s) may include one or more vectors. Thus, converting the second seismic slices into the one or more embeddings may be referred to as seismic-to-vector or "seis2vec." The embedding(s) may form a vector representation of the input seismic image (e.g., the second seismic slices). In other words, the embedding(s) may be or include a reduced vector form of the input seismic image(s). Each of the vectors may include more than 3 dimensions. The vectors may be passed to metrics such as cosine distance or Euclidian distance, which may determine how similar one image (e.g., the second seismic slice(s)) is/are to a reference seismic image (e.g., the first seismic slice(s)). An example of this is illustrated in FIG. 6.

Figure 6:
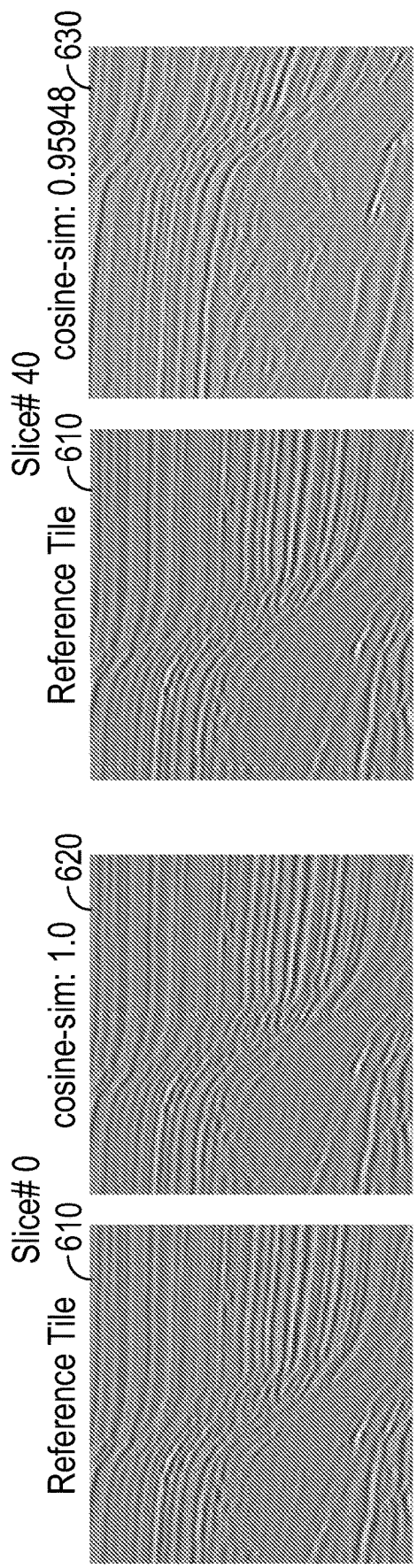
FIG. 6 illustrates a plurality of seismic slices, according to an embodiment.
Figure 6:
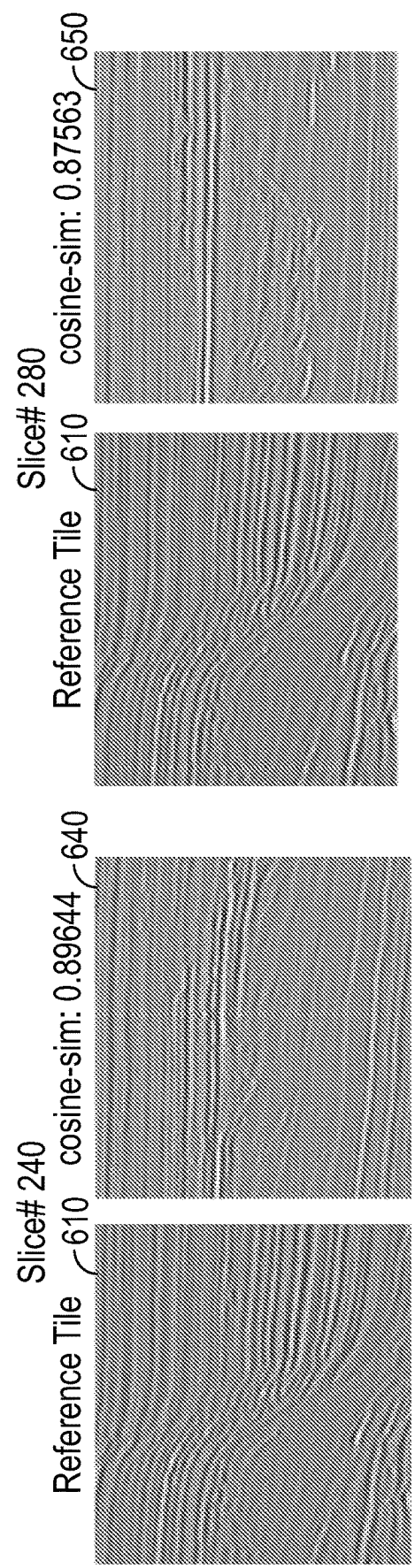

FIG. 6 illustrates a plurality of seismic slices, according to an embodiment. The (four) images 610 on the left are reference tiles from slice #0 in a seismic volume. They are the same and repeated for the sake of comparison to the images on the right. The images on the right are tiles taken from different slices in the seismic volume. More particularly, the image 620 represents the tile from slice #0 (i.e., the same as the reference image 610), the image 630 represents a tile from slice #40, the image 640 represents a tile from slice #240, and the image 650 represents a tile from slice #280. The cosine similarity decreases as the seismic features change. For example, the cosine similarity between the images 610, 620 is 1.0, the cosine similarity between the images 610, 630 is 0.9595, the cosine similarity between the images 610, 640 is 0.8964, and the cosine similarity between the images 610, 650 is 0.8756.

Figure 7:
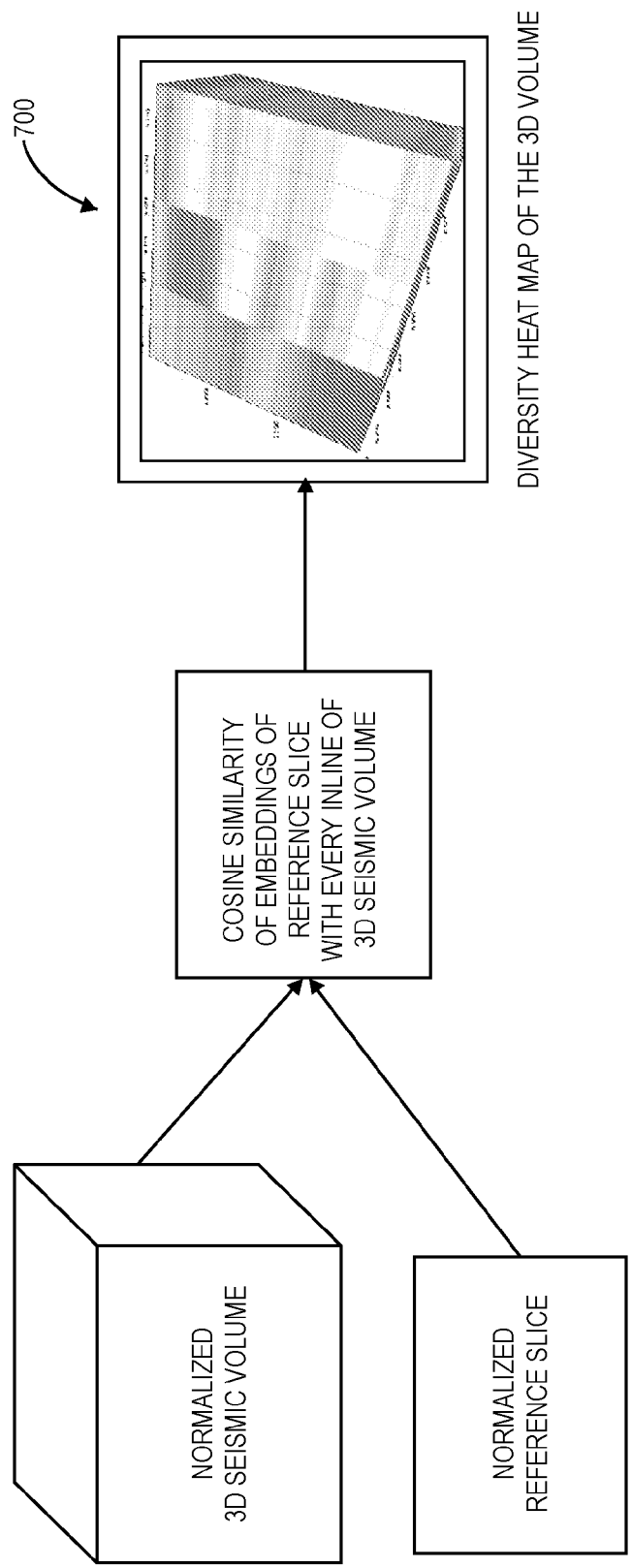
FIG. 7 illustrates a flow diagram showing the diversity in a 3D volume with respect to a reference slice plotted as a heat map of similarity and/or diversity, according to an embodiment.

FIG. 7 illustrates a flow diagram showing the diversity in a 3D volume with respect to a reference slice plotted as a heat map 700 of similarity and/or diversity, according to an embodiment. In this example, cosine similarity is used as a distance measure between the embeddings. In the heat map 700, lighter shades represent higher diversity, and darker shades represent lower diversity.

The method 500 may also include applying a clustering algorithm to the embedding(s) to provide a clustered embedding, as at 520. Once the embeddings of the seismic volume have been obtained for the 3D volume, a clustering algorithm (e.g., a k-means clustering algorithm or a spectral clustering algorithm) may be employed on top of the embeddings.

The method 500 may also include reducing a number of dimensions of the clustered embedding to 2D or 3D to produce a 2D or 3D clustered embedding, as at 522. As mentioned above, the vectors may include more than 3 dimensions, and here, the number of dimensions may be reduced to two dimensions or three dimensions. The number of dimensions may be reduced using principal component analysis (PCA) or t-distributed stochastic neighbor embedding (t-SNE). In one embodiment, a silhouette plot or a screen plot that analyzes the cluster strength may be used to determine the number of clusters.

Figure 8:
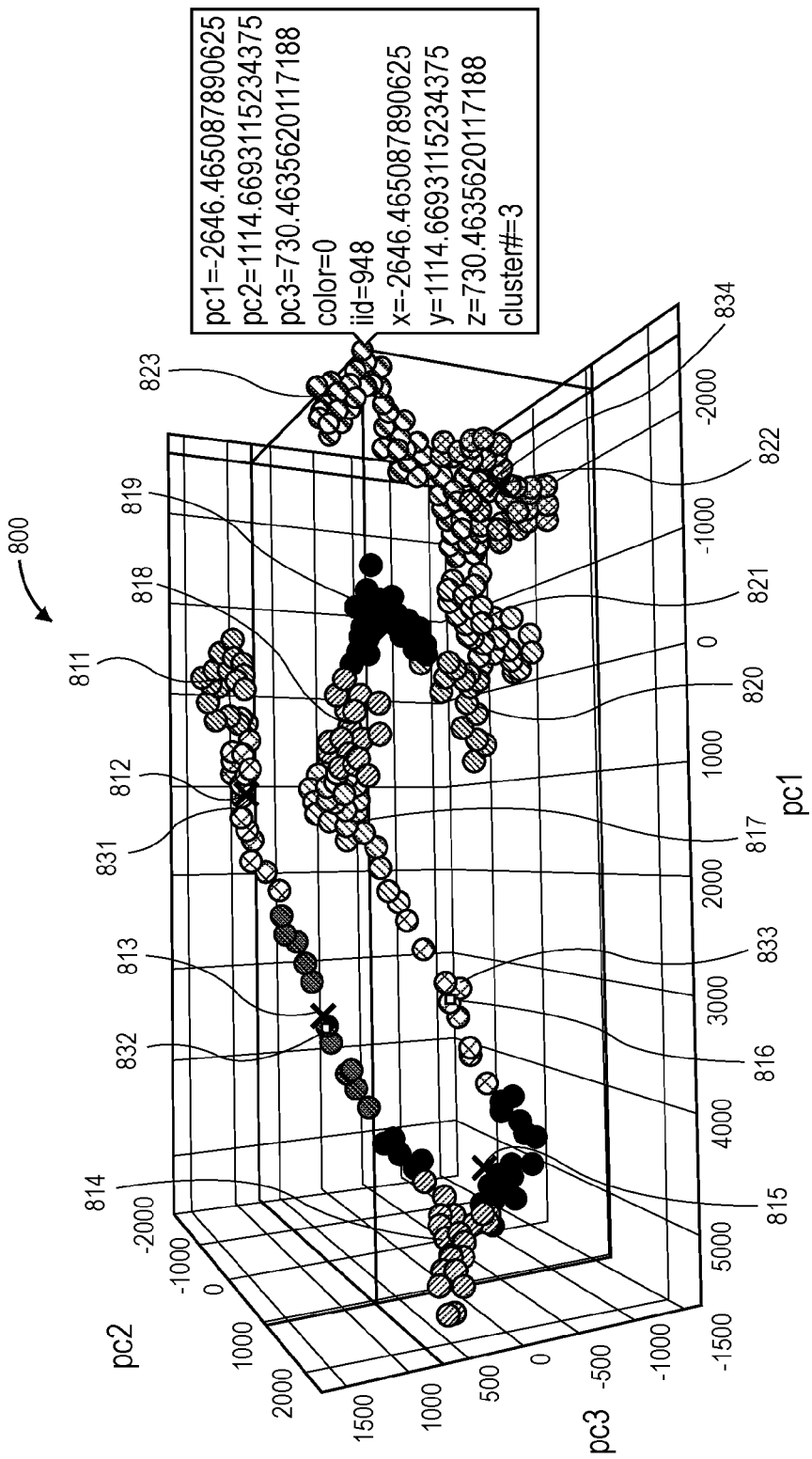
FIG. 8 illustrates a plot of a 2D or 3D clustered embedding, according to an embodiment.

The method 500 may also include generating a plot, as at 524. The plot may be generated based at least partially upon the one or more embeddings, the clustered embedding, the 2D or 3D clustered embedding, or a combination thereof. The clustering algorithm, when applied to the embeddings of the slices of the 3D volume, may help to determine which diverse slices may be selected for training a model, as described below. FIG. 8 illustrates a plot 800 of the 2D or 3D clustered embedding, according to an embodiment. The slices (e.g., points on the plot) that have the same shading represent slices that belong to the same cluster. Reference numbers 811-823 represent the center of a cluster. Reference numbers 831-834 represent recommended slices to train the model.

The method 500 may also include identifying one or more of the second seismic slices in the plot to produce one or more identified slices, as at 526. This may include identifying one or more second seismic slices in the clustered embedding in the plot. In the plot in FIG. 8, the identified slices are represented by reference numbers 831-834.

The method 500 may also include labeling the one or more identified slices to produce one or more labeled slices, as at 528.

Figures 9A, 9B:
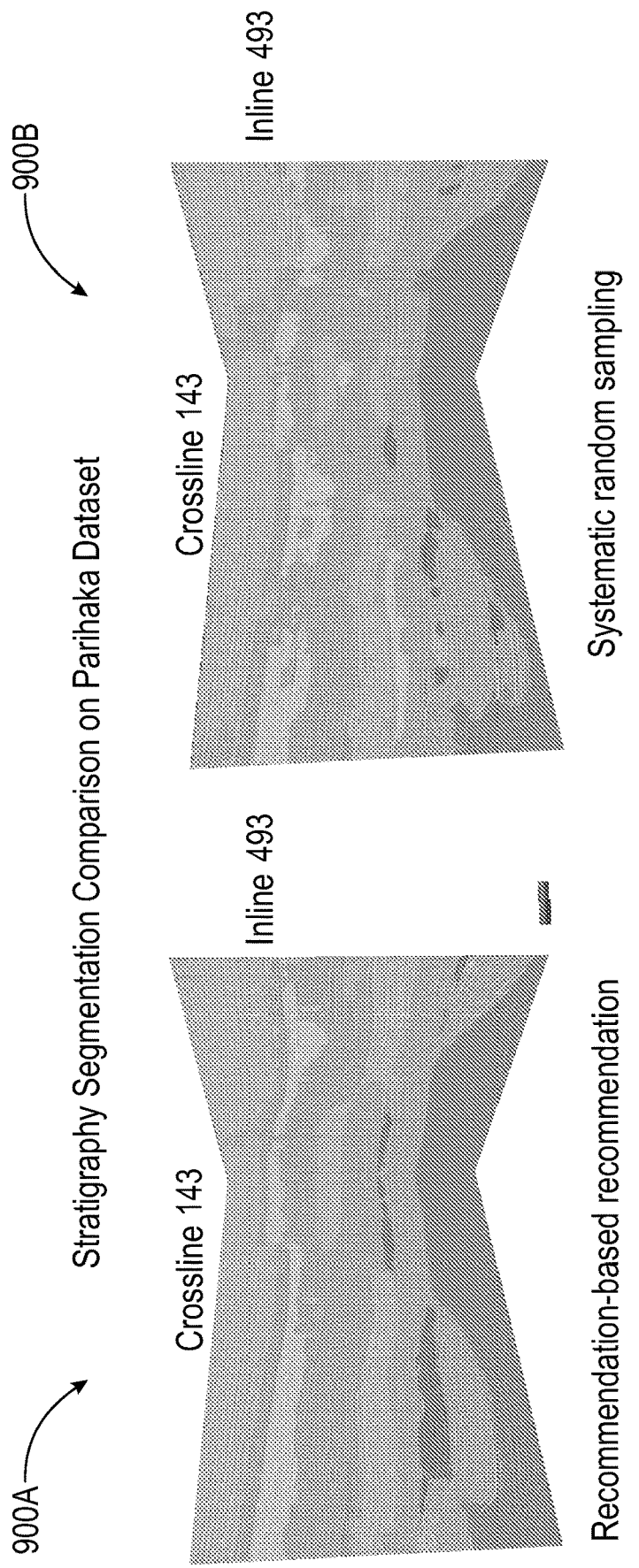
FIG. 9A illustrates a plot of a stratigraphy layer segmentation using the method in FIG. 5.
FIG. 9B illustrates a plot of a stratigraphy layer segmentation using conventional techniques, according to an embodiment.

The method 500 may also include training a model to perform a downstream task, as at 530. The model may be trained based at least partially upon the one or more embeddings, the clustered embedding, the 2D or 3D clustered embedding, the plot, the identified slides, the labeled slices, or a combination thereof. The downstream task may include a geobody segmentation of the second seismic slices. The geobody segmentation may be or include a salt dome segmentation, a fault segmentation, a stratigraphy layer segmentation, or the like. FIG. 9A illustrates a plot 900A of a stratigraphy layer segmentation using the method 500, and FIG. 9B illustrates a plot 900B of a stratigraphy layer segmentation using conventional techniques, according to an embodiment. More particularly, FIG. 9A is generated based at least partially upon the clustering-based recommendation, and FIG. 9B is generated based at least partially upon systematic random sampling. Both segmentations are generated based upon the same seismic survey. FIG. 10 illustrates a table 1000 showing results for FIGS. 9A and 9B, according an embodiment.

The method 500 may also include performing a wellsite action based at least partially upon the downstream task, as at 532. The wellsite action may be or include selecting a location at a wellsite to drill a wellbore into a subterranean formation, drilling the wellbore, varying a trajectory of the wellbore, varying a rate of penetration of a bottom hole assembly (BHA) that is drilling the wellbore, varying a weight on the drill bit (WOB) in the BHA, varying a flow rate and/or composition of a fluid pumped into the wellbore, or a combination thereof. In one embodiment, the computing system may transmit a signal (e.g., to a user or equipment) to instruct the wellsite action to be performed.

The system and method disclosed herein may provide visualization of seismic diversity in a reduced embedding space after generating vectors using an auto-encoder and/or task-specific pre-trained deep learning model and then clustering the vectors. This may reduce the analysis time of geoscientists that determine diversity in a 3D seismic volume. The system and method may also identify and/or recommend one or more slices to be used for training on a 3D survey for geobody extraction of features such as faults, salt, stratigraphy, seafloor, etc. In addition, the system and method may identify and/or recommend how many such slices are sufficient based at least partially upon the cluster strength. The system and method may also generate one or more heat maps to help a user visualize how a similar seismic reference slice may compare to other slices.

Moreover, the system and method may provide a quantitative way to assess diversity and/or similarity between two seismic datasets. As the seismic embeddings may be projected into lower dimension space (e.g., 2D or 3D), the system and method may generate a model or plot to help a user visualize the diversity of a given seismic 3D volume. This may reduce the analysis effort of geo-scientists who are searching for diverse geological characteristics in a seismic survey.

The system and method may be used to determine which slices from the seismic volume are most efficient for ML labeling workflows. The system and method may also be used to determine the density of slices to accurately select for labeling a 3D volume. The system and method may also be used to determine which slices to use for labeling a 3D volume that can then be input into a geobody segmentation ML algorithm. The system and method may also be used to quickly analyze seismic surveys and determine where there is a (e.g., sudden) change in geological features. The clustering may be used to better understand the seismic data. The clustering results may be used to help quantify and compare the ML labeling results and/or to derive outputs to be used by downstream workflows.

Figure 11:
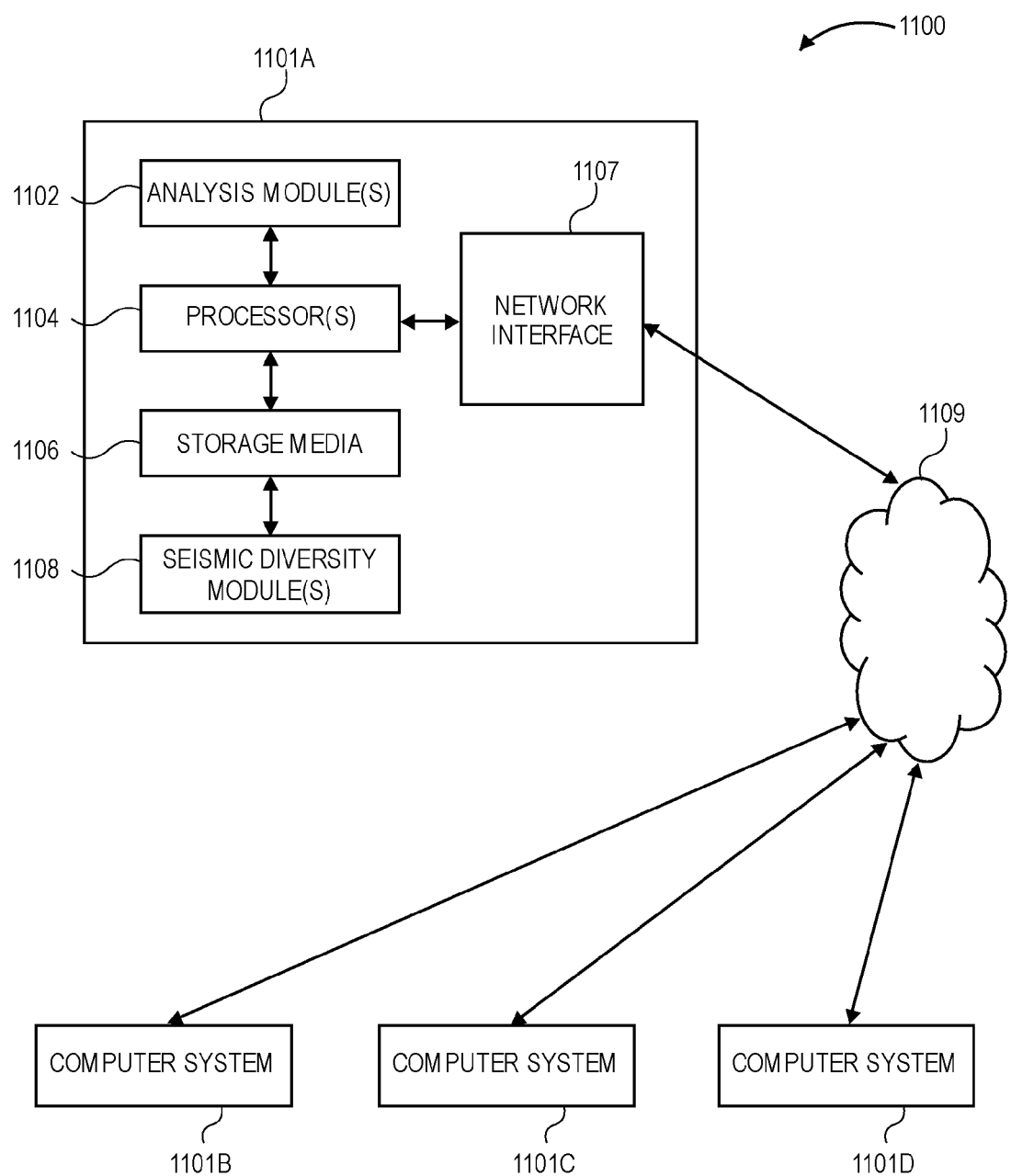
FIG. 11 illustrates a computing system for performing at least a portion of the method(s) disclosed herein, according to an embodiment.

In some embodiments, any of the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis module(s) 1102 configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1100 contains one or more seismic diversity module(s) 1108 that may perform at least a portion of one or more of the method(s) described above. It should be appreciated that computing system 1100 is only one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subterranean three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   receiving one or more training seismic surveys, wherein each of the one or more training seismic surveys comprises a plurality of training seismic slices, and wherein each of the training seismic slices comprises a plurality of tiles;
   normalizing seismic amplitudes of the plurality of tiles to be within a range from −1 to 1;
   randomly shuffling the plurality of tiles, after normalizing the seismic amplitudes, to produce shuffled tiles;
   reconstructing the seismic amplitudes of the shuffled tiles using an auto-encoder;
   training the auto-encoder based at least partially upon the reconstructed seismic amplitudes to produce a trained auto-encoder;

receiving a second seismic survey, wherein the second seismic survey comprises a plurality of second seismic slices;
converting the plurality of second seismic slices into an embedding using the trained auto-encoder, wherein the embedding comprises one or more vectors, and wherein each of the vectors comprises more than 3 dimensions;
applying a clustering algorithm to the embedding to provide a clustered embedding; and
generating a plot based at least partially upon the embedding.

2. The method of claim 1, further comprise calculating a loss between the seismic amplitudes and the reconstructed seismic amplitudes using the auto-encoder, wherein the loss is calculated as a mean square error (MSE) value, and wherein training the auto-encoder comprises training the auto-encoder to reduce the MSE value to produce the trained auto-encoder.

3. The method of claim 1, further comprising reducing a number of dimensions of the clustered embedding to 2D or 3D to produce a 2D or 3D clustered embedding, wherein the plot comprises the 2D or 3D clustered embedding.

4. The method of claim 1, further comprising:
identifying one or more of the second seismic slices in the clustered embedding in the plot to produce one or more identified slices; and
labeling the one or more identified slices to produce one or more labeled slices.

5. The method of claim 4, further comprising training a model to perform a downstream task based at least partially upon the one or more labeled slices.

6. The method of claim 1, further comprising performing a wellsite action based at least partially upon the plot.

7. A computing system, comprising:
one or more processors; and
a memory system comprising one or more non-transitory computer-readable media storing instructions that, when executed by at least one of the one or more processors, cause the computing system to perform operations, the operations comprising:
receiving one or more first seismic surveys, wherein each of the one or more first seismic surveys comprises a plurality of first seismic slices, and wherein each of the first seismic slices comprises a plurality of tiles;
reconstructing seismic amplitudes of the tiles using an auto-encoder;
calculating a loss between the seismic amplitudes and the reconstructed seismic amplitudes using the auto-encoder, wherein the loss is calculated as a mean square error (MSE) value;
training the auto-encoder based at least partially upon the reconstructed seismic amplitudes to reduce the MSE value to produce a trained auto-encoder;
receiving a second seismic survey, wherein the second seismic survey comprises a plurality of second seismic slices;
converting the second seismic slices into an embedding using the trained auto-encoder, wherein the embedding comprises one or more vectors, and wherein each of the one or more vectors comprises more than 3 dimensions;
applying a clustering algorithm to the embedding to provide a clustered embedding;
reducing a number of dimensions of the clustered embedding to 2D or 3D to produce a 2D or 3D clustered embedding;
generating a plot of the 2D or 3D clustered embedding;
identifying one or more of the second seismic slices in the clustered embedding in the plot to produce one or more identified slices; and
labeling the one or more identified slices to produce one or more labeled slices.

8. The computing system of claim 7, wherein the operations further comprise:
normalizing the seismic amplitudes of the tiles to be within a range from −1 to 1; and
randomly shuffling the tiles, after normalizing the seismic amplitudes, to produce shuffled tiles, wherein the seismic amplitudes of the shuffled tiles are reconstructed using the auto-encoder.

9. The computing system of claim 7, wherein the operations further comprise training a model to perform a geobody segmentation based at least partially upon the one or more labeled slices.

10. A non-transitory computer-readable medium storing instructions that, when executed by at least one processor of a computing system, cause the computing system to perform operations, the operations comprising:
receiving one or more first seismic surveys, wherein each of the one or more first seismic surveys comprises a set of two-dimensional (2D) lines or a three-dimensional (3D) volume, wherein each of the one or more first seismic surveys comprises a plurality of first seismic slices, and wherein each of the first seismic slices comprises a plurality of tiles;
normalizing seismic amplitudes of the tiles to be within a range from −1 to 1;
randomly shuffling the tiles, after normalizing the seismic amplitudes, to produce shuffled tiles;
reconstructing the seismic amplitudes of the shuffled tiles using an auto-encoder;
calculating a loss between the seismic amplitudes and the reconstructed seismic amplitudes using the auto-encoder, wherein the loss is calculated as a mean square error (MSE) value;
training the auto-encoder to reduce the MSE value to produce a trained auto-encoder;
receiving a second seismic survey, wherein the second seismic survey comprises a set of 2D lines or a 3D volume, wherein the second seismic survey comprises a plurality of second seismic slices;
normalizing seismic amplitudes of the second seismic slices to be within the range from −1 to 1;
converting the second seismic slices, after normalizing the seismic amplitudes of the second seismic slices, into an embedding using the trained auto-encoder or a pre-trained segmentation task-specific model, wherein the second seismic slices are converted using an encoder of the trained auto-encoder or the pre-trained segmentation task-specific model, wherein the embedding comprises one or more vectors, and wherein each of the one or more vectors comprises more than 3 dimensions;
applying a clustering algorithm to the embedding to provide a clustered embedding;
reducing a number of dimensions of the clustered embedding to 2D or 3D to produce a 2D or 3D clustered embedding;
generating a plot of the 2D or 3D clustered embedding;

identifying one or more of the second seismic slices in the clustered embedding in the plot to produce one or more identified slices;

labeling the one or more identified slices to produce one or more labeled slices; and training a model to perform a downstream task based at least partially upon the one or more labeled slices.

11. The medium of claim 10, wherein reconstructing the seismic amplitudes comprises synthetically introducing gaps into the shuffled tiles.

12. The medium of claim 10, wherein the downstream task comprises a geobody segmentation of the second seismic slices.

13. The medium of claim 10, further comprising transmitting a signal to perform a wellsite action based at least partially upon the model that is trained to perform the downstream task.

14. The medium of claim 13, wherein the wellsite action comprises drilling a wellbore, varying a trajectory of the wellbore, varying a rate of penetration of a bottom hole assembly (BHA) that is drilling the wellbore, varying a weight on a drill bit (WOB) in the BHA, varying a flow rate of a fluid pumped into the wellbore, varying a composition of the fluid pumped into the wellbore, or a combination thereof.

* * * * *